May 30, 1939.　　　L. SCALERA　　　2,160,174
BEDSTEAD COUPLING CONNECTION
Filed Nov. 8, 1938
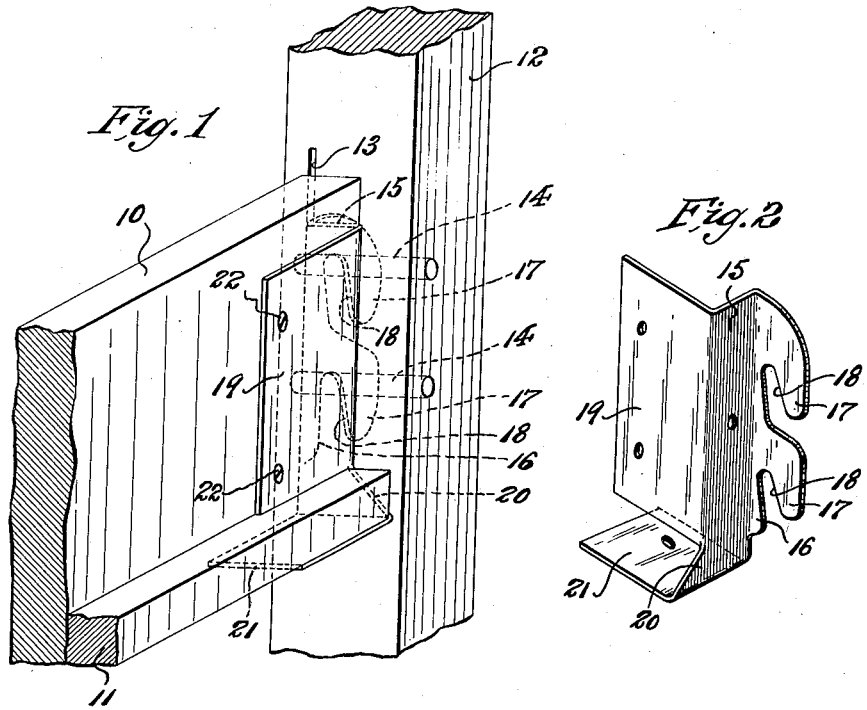
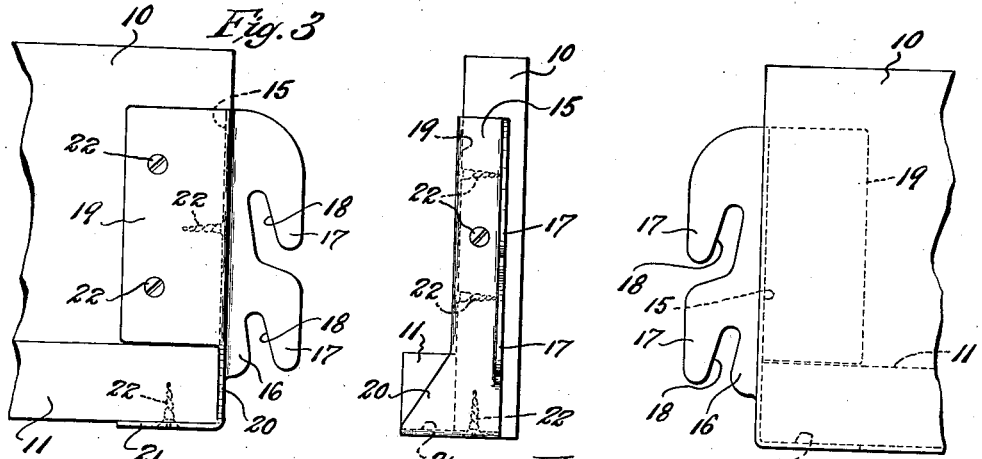
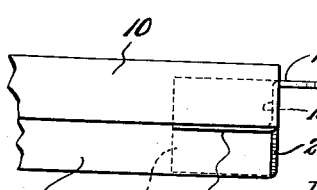
INVENTOR.
Louis Scalera,
BY George D. Richards,
ATTORNEY.

UNITED STATES PATENT OFFICE 2,160,174

BEDSTEAD COUPLING CONNECTION

Louis Scalera, Newark, N. J.

Application November 8, 1938, Serial No. 239,483

4 Claims. (Cl. 5—296)

This invention relates to improvements in coupling connections or corner locks for securing the side members of bedsteads to the posts of the head and foot members thereof.

This invention has for an object to provide a novel construction of coupling connection or corner lock for the purposes mentioned which can be economically produced in the form of a sheet metal stamping, and which is so constructed as to be capable of affixed attachment to end portions of wooden bedstead side members in such manner as to be concealed when viewing the outer faces of the side members, but nevertheless so as to provide strong and durable support to the side members and especially to the bed slat or spring rests or rails with which wooden bedstead side members are usually equipped to extend along the lower marginal portions of their inner faces.

The invention has for a further object to provide a coupling connection, characterized as above stated, having endwise projecting coupler hooks to enter the slotted recess of a bedstead corner post for coupling engagement with the transverse anchor pins with which said posts are equipped.

Other objects of this invention, not at this time more particularly enumerated, will be understood from the following detailed description of the same.

An illustrative embodiment of this invention is shown in the accompanying drawing, in which:—

Fig. 1 is a fragmentary perspective view of a bedstead side member and corner post as coupled together by means of the novel coupling connection according to this invention; Fig. 2 is a perspective view of the novel coupling connection per se; Fig. 3 is an inside face view of a bedstead side member equipped with the coupling connection of this invention; Fig. 4 is an end elevation of the same; Fig. 5 is an outside face view of the same; and Fig. 6 is a top elevational view of the same.

Similar characters of reference are employed in the above described views, to indicate corresponding parts.

In the drawing, the reference character 10 indicates the side member of a wooden bedstead, the same having secured to and along the lower longitudinal marginal portion of its inside face, an inwardly projecting bed slat or spring rest or rail 11.

The reference character 12 indicates a wooden corner post with which the head and foot members of the bedstead are provided. Entering into the transverse inner face of said corner post 12 is a slot 13, and extending through the post 12, so as to cross said slot 13, are a pair of vertically spaced anchor pins 14; this structure and arrangement being well known in the art.

The novel coupling connection or corner lock according to this invention consists in a unitary structure, preferably formed from sheet metal stock of substantial gauge, although the structure may be made of cast metal should this method of production thereof be desirable. The novel coupling connection or corner lock comprises an end plate 15, preferably of less width than the thickness of the bedstead side member 10 to which the coupling connection or corner lock is to be applied. This end plate 15 is applied to the end face of a bedstead side member 10, and is preferably countersunk therein so that the outer face of said end plate 15 is flush with the surface of said side member end face. Springing from the outer vertical margin of said end plate 15, to extend outwardly at right angles thereto, and thus so as to project endwise from the side member end in a plane parallel to the plane of the latter, is a coupler hook plate 16. Said coupler hook plate is formed at its outer end to provide a pair of vertically spaced coupler hook elements 17, the inner margins 18 of which are inwardly and upwardly inclined, to provide wedging cam formations for purposes to be subsequently mentioned. Springing from the inner vertical margin of said end plate 15, to extend downwardly from its top toward its bottom end, and so as to project rearwardly at right angles thereto, whereby it will abut the inner face of the bedstead side member 10, is a side plate 19. This side plate is of less vertical height than the vertical height of the end plate 15, so that it will fit against the inner face of the bedstead side member 10 above the bed slat or spring rest or rail 11 which projects laterally or in inwardly offset relation to said inner face of said bedstead side member 10. Said end plate 15 is provided in connection with its lower end portion, which extends beyond the lower edge of said side plate 19, with a laterally extending wing member 20 lying in the plane thereof which is adapted to overlie the end of said bed slat or spring rest or rail 11. Springing from the lower extremity of said end plate 15 and its extended wing member, to extend horizontally rearward therefrom and at right angles thereto, so as to underlie and abut both the underside edge of said bedstead side member 10 and the underside of said bed slat or spring rest or rail 11, is a bottom plate 21.

The coupling connection or corner lock structure formed as above described and operatively related to an end portion of the bedstead side member 10 and the bed slat or spring rest or rail 11 connected with the latter, may be secured to these parts in any suitable manner. For example, fastening screws 22 may be passed through selected parts thereof to screw into the body of said bedstead side member 10. The disposition and arrangement of said fastening screws is subject to wide variation. One satisfactory disposition and arrangement of the fastening screws 22, as shown in the drawing, consists in passing certain thereof through the end plate 15, others through the side plate 19, and another through the bottom plate 21.

In utilizing the novel coupling connection or corner lock structure to operatively couple an end of a bedstead side member to a corner post 12 of the bedstead, the endwise projecting coupler hook elements 17 are inserted through the slot 13 of the bedstead corner post 12 so as to respectively pass over the respective anchor pins 14, whereupon the side member 10 is pushed downwardly to engage said anchor pins in the bights of said hook elements 17. Due to the inclined rear marginal edges 18 of said hook elements 17, when the latter are thus pushed downwardly over the anchor pins, the camming action of said edges 18 serve to draw the hook elements inwardly, thereby likewise drawing the end of the bedstead side member 10 into tight abutting relation to the inner transverse face of the bedstead corner post 12, thus effecting a very tight connection between these parts entirely free from loose play or vibration.

Owing to the provision of the bottom plate 21 which, by the provision of the extending wing member 20, is of greater width than the width of the end plate 15, said bottom plate 21 underlies both the bottom edge of the bedstead side member 10 and the underside or bottom of the slat or spring rest or rail 11, thereby not only strongly reenforcing the support of said side member 10 in such manner as to relieve the fastening screws 22 from the major support for the rest or rail 11 against any tendency to loosen relative to the side member or break away therefrom under the weight of the bed spring, mattress and occupant or occupants of the bed. Furthermore, the provision of the wing member 20, as extending across the end of the slat or spring rest or rail 11, relieves the latter of all endwise strain or stress which might otherwise tend to loosen the same from its secured assembled relation to the bedstead side member 10. The combination of the vertically disposed side plate 19 and horizontally disposed bottom plate 21 assures a strong embracing support of the bedstead side member end portion as well as a strengthening reenforcement thereof calculated to prevent accidental splitting or other injury thereto.

It will be observed that not withstanding the strong supporting and reenforcing effects obtained by the novel coupling connection or corner lock, such effects are obtained without marring the exposed or exterior visible parts of the bedstead, since the coupling connection or corner lock parts are so formed and related as to be entirely concealed as applied to the bedstead side member and used to couple the same to a corner post.

Having now described my invention and its advantages in use, I claim:

1. In means for detachably coupling a side member to a corner post of a bedstead, said side member being provided along its inner face, contiguous to its lower longitudinal edge, with a laterally projecting rest for slats, springs or the like; a unitary coupling connection affixed to said side member comprising, an end plate to abut the side member end, a side plate to abut the inner face of said side member, and a bottom plate springing from the lower end of said end plate to extend beneath and in supporting relation to both the bottom edge of said side member and the underside of the rest carried by the latter; and freely projecting coupling means extending from said end plate and adapted to be detachably engaged with cooperating coupling means with which the bedstead corner post is provided.

2. In means for detachably coupling a side member to a corner post of a bedstead, said side member being provided along its inner face, contiguous to its lower longitudinal edge, with a laterally projecting rest for slats, springs or the like, and said corner post having a receiving slot crossed by anchor pin means; a unitary coupling connection affixed to said side member comprising, an end plate to abut said side member end, a side plate to abut the inner face of said side member, and a bottom plate springing from the lower end of said end plate to extend beneath and in supporting relation to both the bottom edge of said side member and the underside of the rest carried by the latter; and coupler hook means projecting from said end plate in a plane parallel to the plane of said side member and adapted to enter the corner post receiving slot to hook over said anchor pin means.

3. In means for detachably coupling a side member to a corner post of a bedstead, said side member being provided along its inner face, contiguous to its lower longitudinal edge, with a laterally projecting rest for slats, springs or the like; a unitary coupling connection affixed to said side member comprising, an end plate countersunk in the end face of said side member, a side plate extending rearwardly from a vertical edge of said end plate to abut the inner face of said side member above the rest carried thereby, said end plate having at its lower portion a lateral wing section in the plane thereof to abut the end of the rest carried by said side member, and said end plate and its wing section terminating in a rearwardly extending horizontal bottom plate to abut the undersides of the side member and its rest; and freely projecting coupling means extending from said end plate and adapted to be detachably engaged with cooperating coupling means with which the bedstead corner post is provided.

4. In means for detachably coupling a side member to a corner post of a bedstead, said side member being provided along its inner face, contiguous to its lower longitudinal edge, with a laterally projecting rest for slats, springs or the like, and said corner post having a receiving slot crossed by anchor pin means; a unitary coupling connection affixed to said side member comprising, an end plate countersunk in the end face of said side member, a side plate extending rearwardly from a vertical edge of said end plate to abut the inner face of said side member above the rest carried thereby, said end plate having at its lower portion a lateral wing section in the plane thereof to abut the end of the rest carried by said side member, and said end plate and its wing section terminating in a rearwardly extending horizontal bottom plate to abut the undersides of said side member and its rest; and coupler hook means projecting forwardly from said end plate in a plane parallel to the plane of said side member and adapted to enter the corner post receiving slot to hook over said anchor pin means.

LOUIS SCALERA.